United States Patent [19]

Isono et al.

[11] Patent Number: 5,007,055
[45] Date of Patent: Apr. 9, 1991

[54] INFORMATION DISTRIBUTION SYSTEM

[75] Inventors: Osamu Isono; Toshimasa Fukui; Tetsuo Nishino; Tetsuo Tachibana, all of Kawasaki; Eisuke Iwabuchi, Yokohama, all of Japan

[73] Assignee: Fujitsu Limited, Kawasaki, Japan

[21] Appl. No.: 314,792

[22] Filed: Feb. 24, 1989

[30] Foreign Application Priority Data

Feb. 25, 1988 [JP] Japan .................................. 63-40820

[51] Int. Cl.⁵ ............................................. G08C 25/02
[52] U.S. Cl. ..................................................... 371/32
[58] Field of Search ............................. 371/32, 33, 35

[56] References Cited

U.S. PATENT DOCUMENTS

| | | | |
|---|---|---|---|
| 3,979,719 | 9/1976 | Tooley et al. | 371/32 |
| 4,149,142 | 4/1979 | Kageyama et al. | 371/32 |
| 4,422,171 | 12/1983 | Wortley et al. | 371/32 |
| 4,896,151 | 1/1990 | Kuranami et al. | 371/32 |

Primary Examiner—Charles E. Atkinson
Attorney, Agent, or Firm—Staas & Halsey

[57] ABSTRACT

An information distribution system includes a node station and a plurality of terminal devices connected through transmission lines with the node station. The node station includes a distribution information storage unit for storing information which is to be distributed to the plurality of terminal devices, and a re-transmission request response unit for re-transmitting information in question in response to requests from the plurality of terminal devices. Each of the terminal devices includes an error checking unit for checking transmission failure in the data transmission based on the received information. The transmitted information is divided into a plurality of blocks, and, after the completion of reception of all block-form information, a re-transmission of information is requested, and based on this request, a re-transmission of information is carried out.

2 Claims, 7 Drawing Sheets

INFORMATION DISTRIBUTION SYSTEM

BACKGROUND OF THE INVENTION

1. Field of the Invention

The present invention relates to an information distribution system having a node station and a plurality of terminal devices connected through transmission lines to the node station. The system according to the present invention is used, for example, for a digital data exchange (DDX) network, an integrated services digital network (ISDN), an information system network (INS), and the like. In such a system, distribution information is distributed from a node station to a plurality of terminal devices taking the requirements such as X25 Protocol for DDX network, Interface Bch Packet for ISDN network, and the like into consideration.

2. Description of the Related Arts

In general, in the distribution of information from a node station to a plurality of terminal devices, it is necessary to confirm the completion of each transmission of information from a node station to a plurality of terminal devices. If a failure occurs in the transmission of information, it is necessary to detect this failure and re-transmit the information which has not been correctly transmitted based on this detection.

In prior art information distribution systems, there have been problems that the process of the detection of a failure and the re-transmission of information is carried out in data block units and takes a considerable length of time, and accordingly causes an increase of the time the transmission lines are occupied.

SUMMARY OF THE INVENTION

It is an object of the present invention to provide an improved information distribution system having a node station and a plurality of terminal devices connected through transmission lines to the node station, in which failures in the information transmission are detected without complicating the process and re-transmission of information which has not been correctly transmitted is quickly and reliably carried out.

In accordance with the present invention there is provided an information distribution system having a node station and a plurality of terminal devices connected through transmission lines with the node station, in which the node station includes a distribution information storage unit for storing information which is to be distributed to the plurality of terminal devices, and a re-transmission request response unit for re-transmitting information in question in response to requests from the plurality of terminal devices. Each of the terminal devices includes an error checking unit for checking for transmission failure in the data transmission based on the received information, and the transmitted information is divided into a plurality of blocks, after the completion of receptions of all block-form information, a re-transmission of information is requested, and then, based on this request, the re-transmission of information is carried out.

BRIEF DESCRIPTION OF THE DRAWING

In the drawings,

FIG. 1, comprised of FIGS. 1A and 1B, shows a prior art information distribution system having a node station and a plurality of terminal devices;

FIG. 3, comprised of FIGS. 3A and 3B, shows an information distribution system having a node station and a plurality of terminal devices according to an embodiment of the present invention;

DESCRIPTION OF THE PREFERRED EMBODIMENTS

Figure 1A:
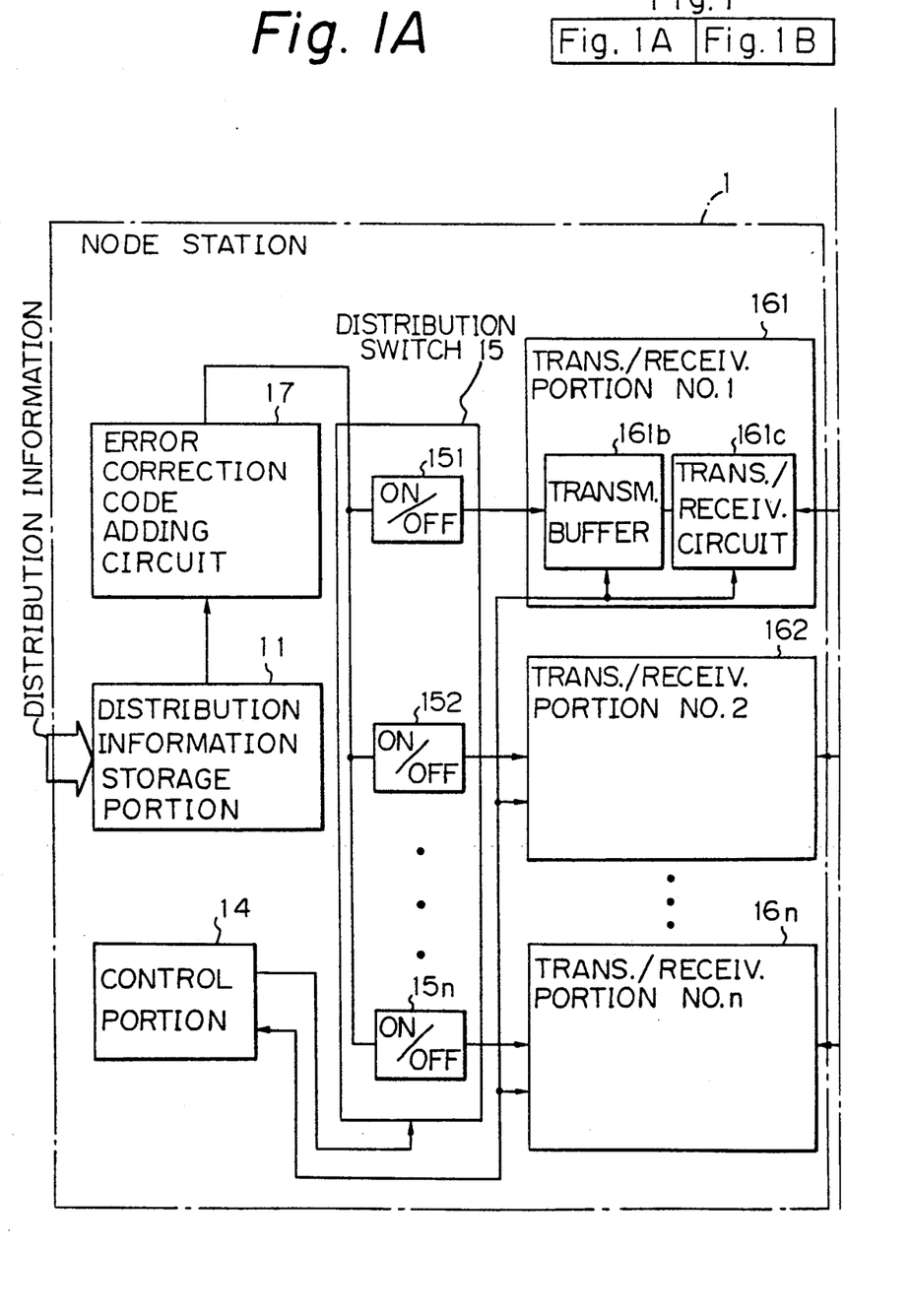
Figure 1B:
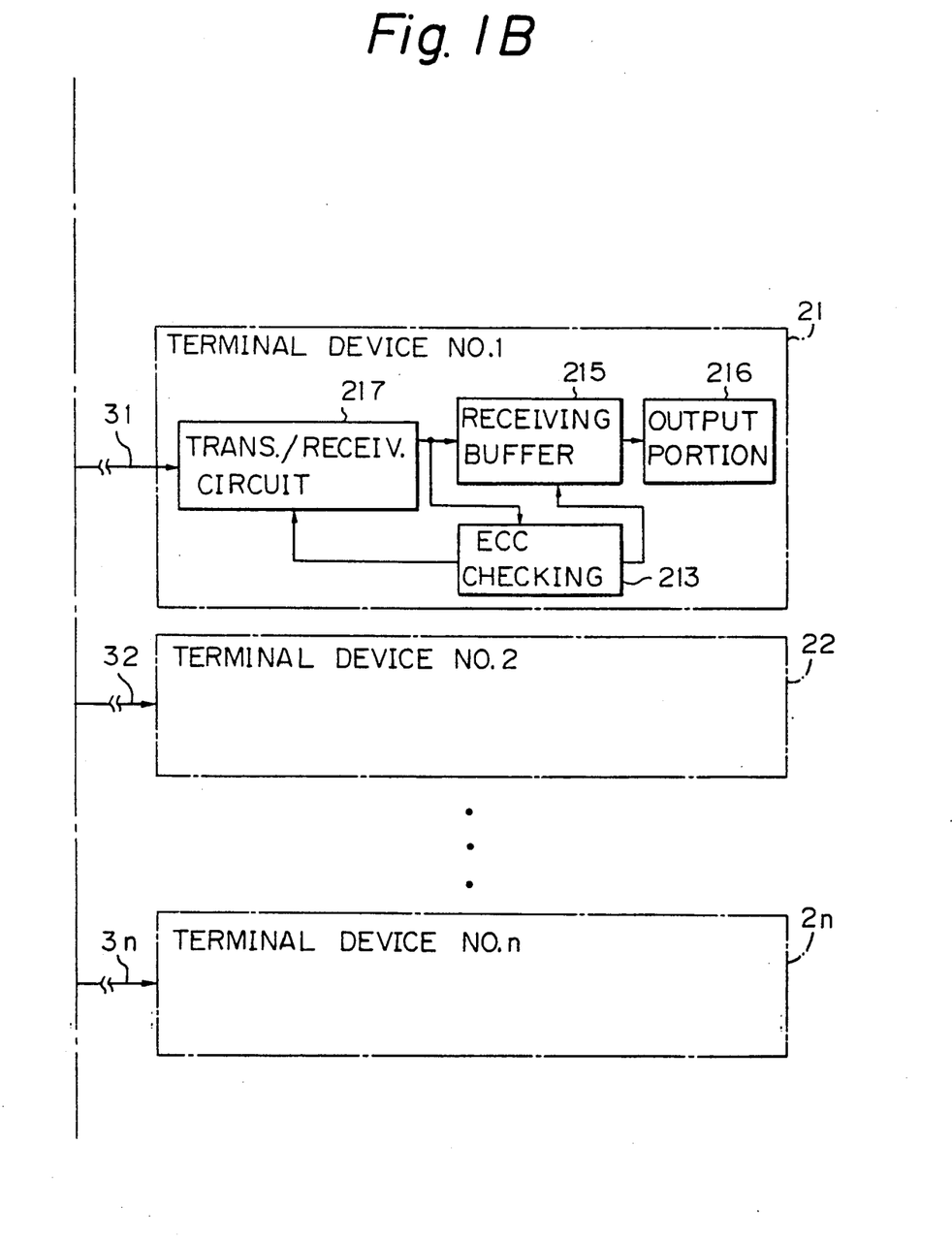
Figure 2:
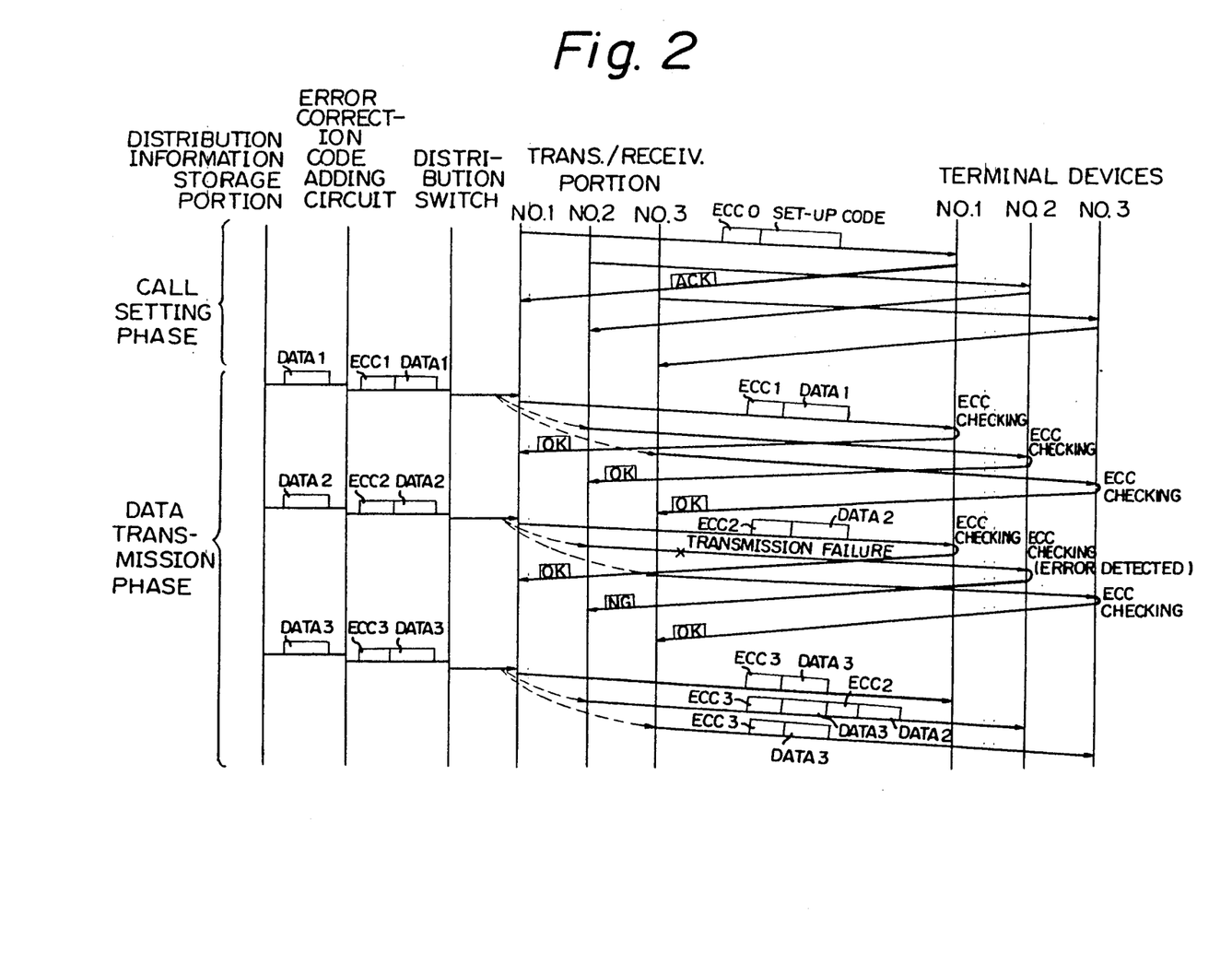
FIG. 2 illustrates a sequence of operations of the system of FIG. 1.

Before describing a preferred embodiment of the present invention, a prior art information distribution system having a node station and a plurality of terminal devices is described below with reference to FIGS. 1 and 2. A sequence of operation of the prior art system of FIG. 1 is illustrated in FIG. 2.

In the call setting phase, the control portion 14 of the node station 1 transmits a set-up signal to each of the terminal devices 21, 22, ... 2n to which the distribution information is to be distributed, and the terminal devices then send back acknowledgement (ACK) signals indicating the completion of the set-up, to the node station, after which, the process proceeds to the data transmission phase.

In the data transmission phase, first, the close points 151, 152, ... 15n of the distribution switch 15 are selectively closed by the operation of the control portion 14, and the output of the error correction code adding circuit 17 is supplied through the contacts of the distribution switch 15 to the transmitting/receiving portions 161, 162, ..., 16n for supplying the terminal devices 21, 22, ... 2n to which the distribution information is to be distributed with the transmitted information.

After that, data Nos. 1, 2, ... m which are units of the information to be distributed are sequentially read from the distribution information storage portion 11, and an error correction code is added to each of the data units by the error correction code adding circuit 17 so that transmission information is produced.

First, transmission data constituted by the data No. 1 and the added error correction code is transmitted through the distribution switch 15 to the transmitting/receiving portions 161, 162, ... 16n, and the transmitted data is stored in the transmission buffer of the transmitting/receiving portion. The transmission data is read from the transmission buffer of the transmitting/receiving portion under the control of the control portion 14, and the read transmission data is transmitted from the transmitting/receiving circuit of the transmitting/receiving portion through the transmission lines 31, 32, ... 3n to the terminal devices 21, 22, ... 2n.

Upon receipt of the transmitted data at a terminal device, for example the terminal device 21, the transmission data No. 1 is stored in the receiving buffer 215 in the terminal device 21, and is supplied to the error correction code checking circuit 213 in which the error checking is carried out.

When there is no error in the received transmission block, an OK signal indicating the absence of error is sent from the transmitting/receiving circuit 217 to the transmitting/receiving circuit 161C in the transmitting/receiving portion 161 of the node station 1.

It is possible to supply the output portion 216, for example, a printer, a display device, or the like, in the terminal device 21 with the data No. 1 which is stored in the receiving buffer 215 to effect a visible display.

It is also possible to supply the output portion 216 with the data to be printed or displayed after a plurality of data according to the characteristic of the output device is stored in the receiving buffer 215.

When the node station 1 receives response signals, such as OK signals, from all the terminal devices 21, 22, . . . 2n, the next data No. 2 is transmitted from the node station to the terminal devices in a similar manner as in the case of the data No. 1. When a transmission failure occurs during the transmission to the terminal device No. 2 as indicated by X in FIG. 2, an NG signal indicating the occurrence of a failure is sent from the terminal device No. 2 to the node station 1.

After that, the node station 1 which has received the above-mentioned OK and NG response signals transmits the next data No. 3 to the terminal devices 21, 22, . . . 2n. In this case, the data No. 2 with accompanying error correction code is re-transmitted to the terminal device No. 2 which sent the NG signal, prior to the transmission of the data No. 3 with accompanying error correction code. Accordingly, the data No. 2, the first transmission of which to the terminal device No. 2 has failed to be correctly received by the receiving buffer, is re-transmitted to the terminal device No. 2 and stored therein as correct data.

Figure 4:
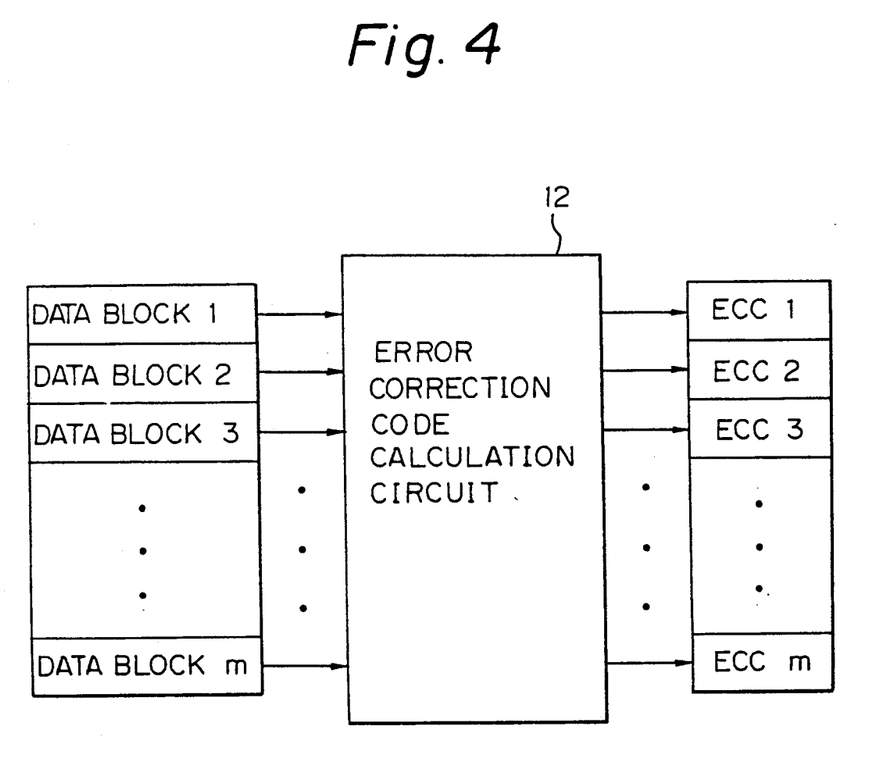
FIG. 4 illustrates the operation of the error correction code calculation circuit used for the system of FIG. 3.
Figure 5:
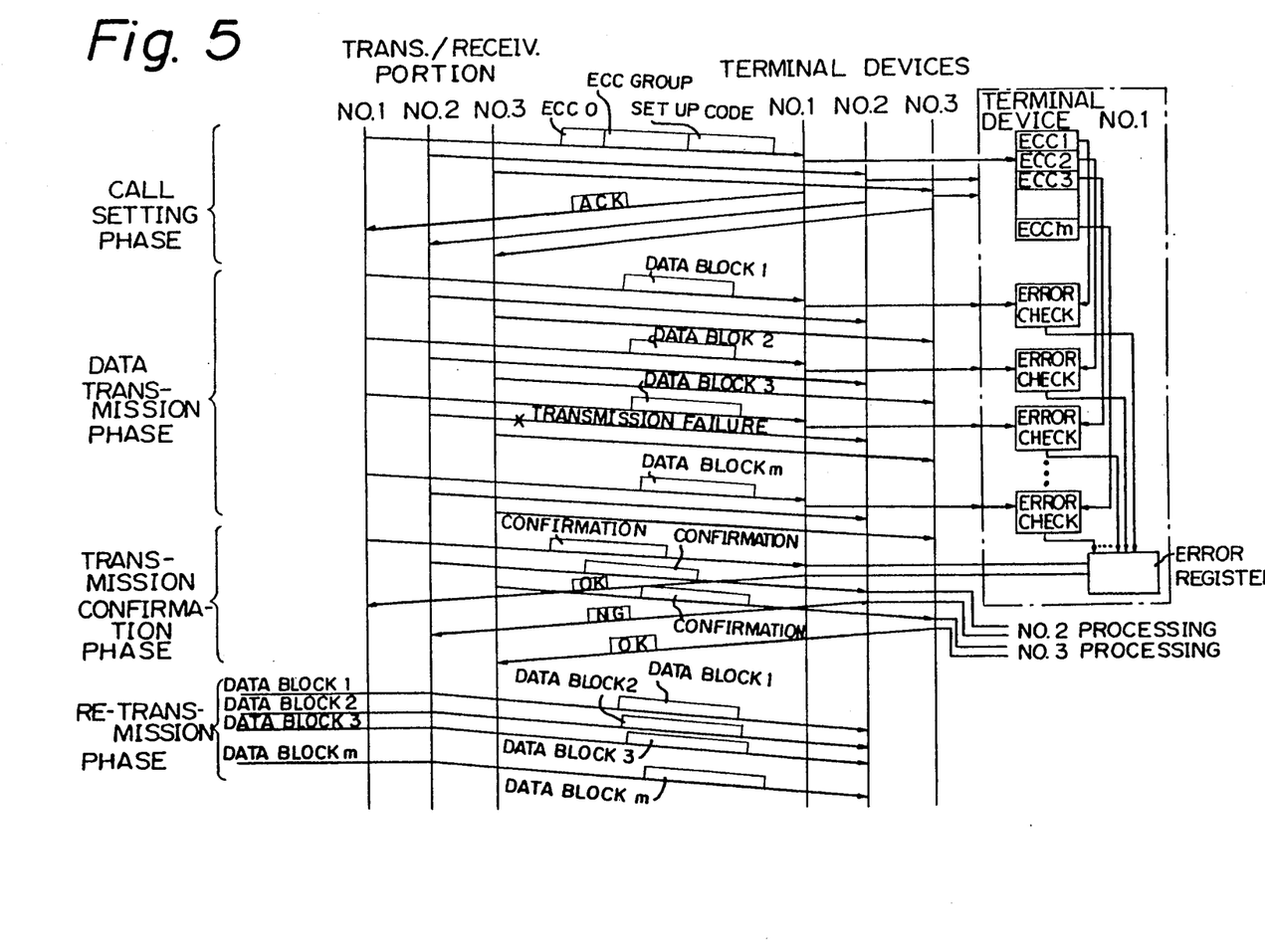
FIG. 5 illustrates a sequence of operations of the system of FIG. 3.

An information distribution system having a node station and a plurality of terminal devices according to an embodiment of the present invention will now be described with reference to FIG. 3. The operation of the error correction code calculation circuit used for the system of FIG. 3 is illustrated in FIG. 4, and a sequence of operation of the system of FIG. 3 is illustrated in FIG. 5.

Figure 3A:
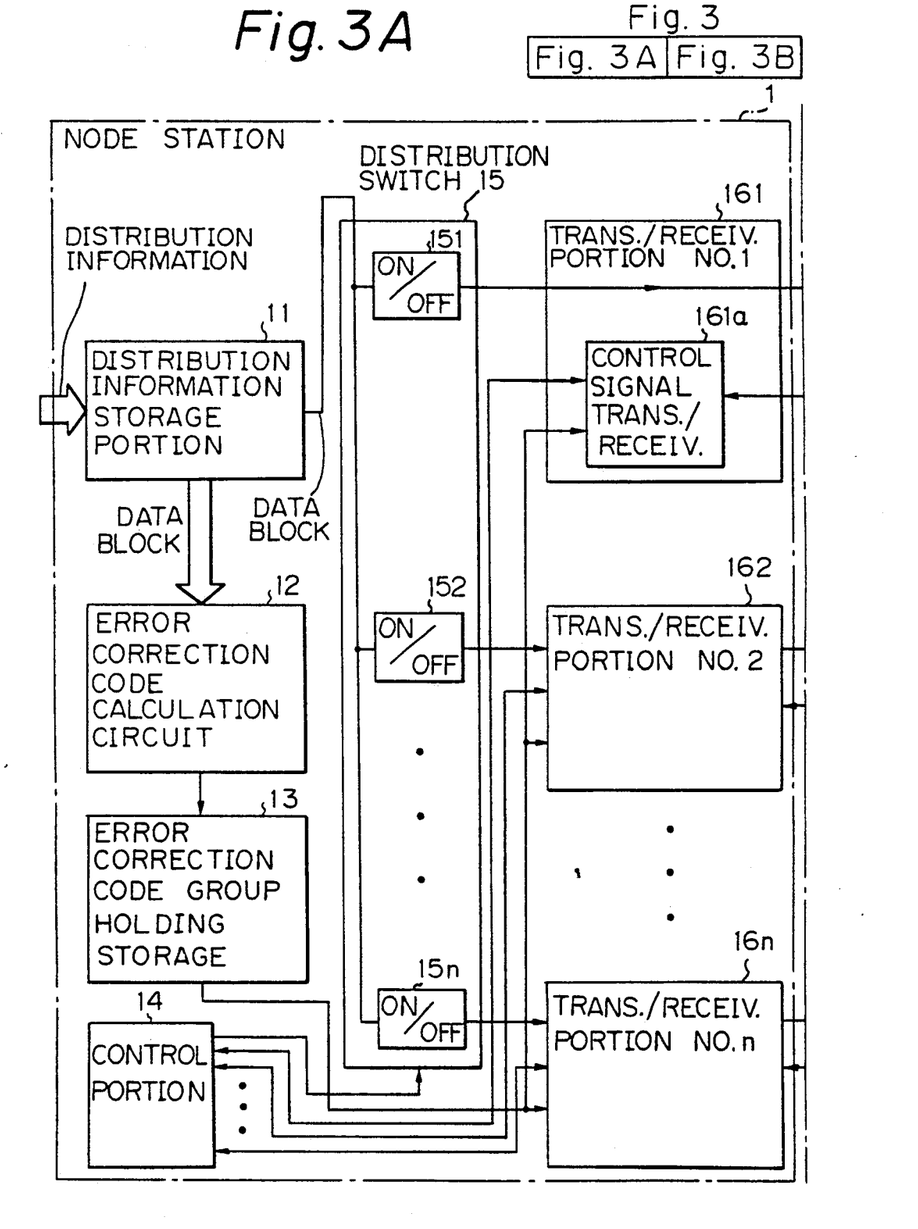
Figure 3B:
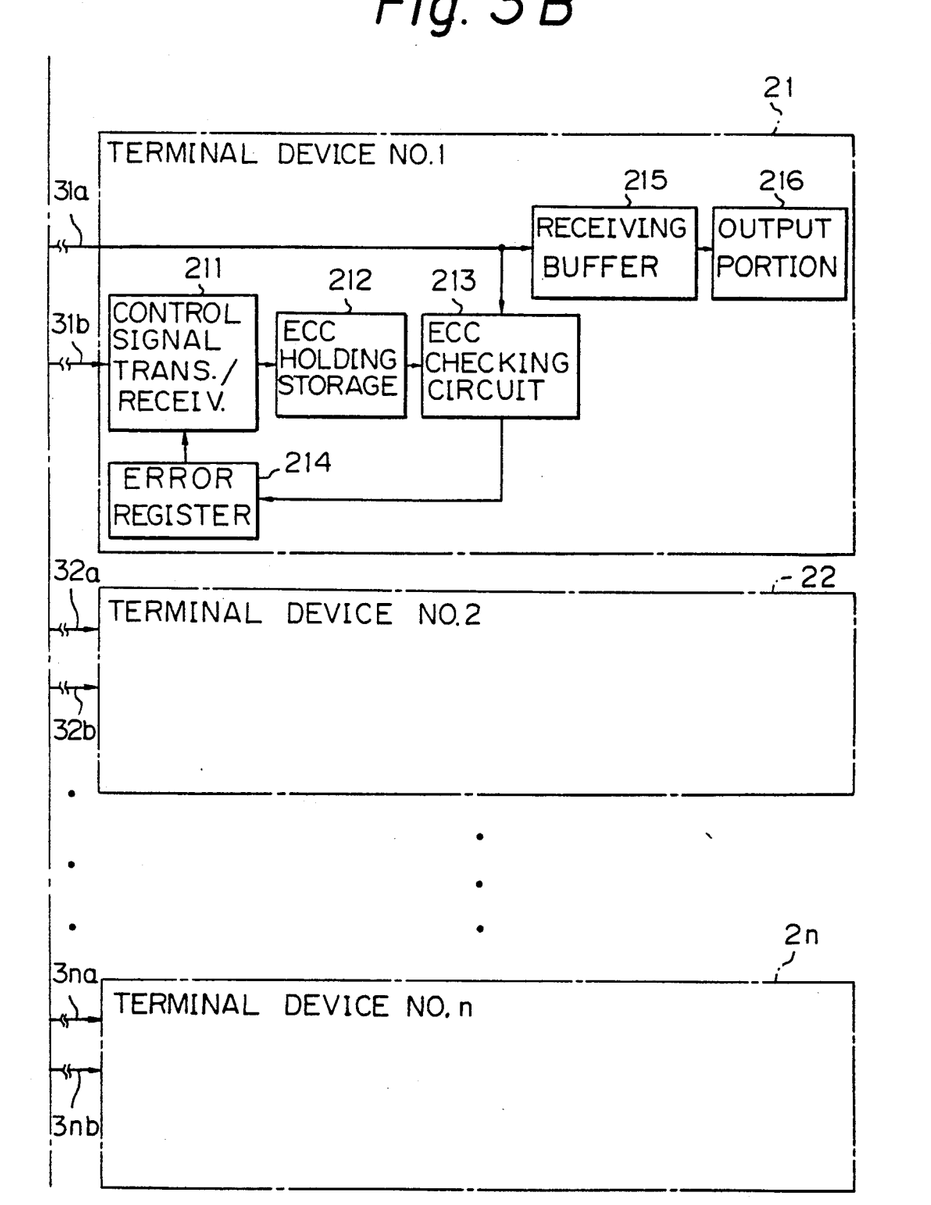

The system of FIG. 3 is constituted by a node station 1, a plurality of terminal devices (No. 1, No. 2, . . . No. n) 21, 22, . . . 2n, data transmission lines 31a, 32a, . . . 3na, and control signal transmission lines 31b, 32b, . . . 3nb. The node station includes a distribution information storage portion 11, an error correction code calculation circuit 12, an error correction code group holding storage 13, a control portion 14, a distribution switch 15, and transmitting/receiving portions (No. 1, No. 2 . . . No. n) 161, 162, 16n.

The terminal device (No. 1) 21 includes a control signal transmitting/receiving portion 211, an error correction code holding storage 212, an error correction code checking circuit 213, an error register 214, a receiving buffer 215, and an output portion 216.

The terminal device 21 is connected to the transmitting/receiving portion 161 of the node station 1 through the data transmission line 31a and the control signal transmission line 31b. The data transmission line 31a and the control signal transmission line 31b may be the same line used in a time sharing manner.

In the node station 1, the distribution information storage portion 11 stores the distribution information which is supplied from the preceding station and is to be distributed to the terminal devices 21, 22, . . . 2n. The error correction code calculation circuit 12 produces an error correction code, such as a cyclic redundancy code (CRC), for each data block No. 1 to No. m, of, for example, 2 K Byte, which is a unit of transmission of the distribution information. The group of error correction codes produced, consisting of the error correction codes ECC-1, ECC-2, . . . ECC-m regarding all of the produced data blocks No. 1, No. 2, . . . No. m, is stored in the error correction code group holding storage 13.

In the call setting phase (FIG. 5), the control portion 14 supplies the control signal transmitting/receiving member 161a of the transmitting/receiving portion 161 with a set-up signal. This set-up signal is transmitted together with the error correction code from the error correction code group holding storage 13 to a terminal device through the control signal transmission line 31b.

In the call setting phase as shown in FIG. 5, a sequence of set up signal, error correction code group ECC-1, ECC-2, . . . ECC-m, and an error correction code ECC-0 is transmitted from the transmitting/receiving portion to the terminal device through the control signal transmission line.

The error correction code (ECC), such as a cyclic redundancy code (CRC), is a well-known code usually used for the correction and detection of errors in data including set-up code and error correction code groups.

In the terminal device 21 which receives the set-up signal and the error correction code group, the error correction code group is separated by the control signal transmitting/receiving portion 211 and the separated error correction code group is written into the error correction code holding storage 212. The terminal device 21 then sends back an acknowledgement (ACK) signal indicating the completion of receiving of the set-up signal and the error correction code group in the node station 1.

Upon receiving the ACK signal sent back from all the terminal devices to which the distribution information is to be distributed, the node station 1 is brought to the data transmission phase in which the first data block No. 1 of the distribution information is read from the distribution information storage portion 11 and the first read data block No. 1 is supplied to the distribution switch 15 as shown in FIG. 5.

In the distribution switch 15, each of the close points 151, 152, . . . 15n is selectively made on to enable the transmission of the distribution information to a terminal device to which the distribution information is to be distributed through a data transmission line based on the connection information from the control portion 14.

The first data block No. 1 read from the distribution information storage portion 11 is transmitted simultaneously through the distribution switch 15 to the terminal devices to which the distribution information is to be distributed, when the transmission of the first data block No. 1 is completed, the second data block No. 2 is transmitted, and then the third, fourth, . . . m-th data blocks are successively transmitted from the distribution information storage portion 11 to the terminal devices 21, 22, . . . 2n.

In each of the terminal devices 21, 22, . . . 2n, upon receipt of the data block, the error checking of the data block Nos. 1, 2, . . . m for each of the received data blocks is carried out by the error correction code checking circuit 213, and the detected error is written into the error register 214 to be stored therein.

When all of the transmissions of the data blocks from the node station 1 are completed, the node station 1 is brought to a transmission confirmation and re-transmission phase as shown in FIG. 5, in which it is determined, with regard to all of the terminal devices to which the distribution information was distributed, whether or not the receipt of all data blocks has been completed normally.

Assuming that a transmission failure occurs during the transmission of data block No. 3 from the node station 1 to the terminal device No. 2 as shown by X in FIG. 5, error information indicating the occurrence of the failure in the received data is written in the error register of the terminal device No. 2, and an NG signal indicating the occurrence of a failure in the received data is sent from the terminal device No. 2 to the node station 1 in response to the confirmation request from the node station 1 to the terminal device No. 2. From each of the terminal devices where no transmission failure occurs, an OK signal indicating the absence of failure in the received data is sent to the node station 1.

When the control signal transmitting/receiving member of the transmitting/receiving portion 162 receives the NG signal from the terminal device No. 2, information indicating the terminal device from which this NG signal is transmitted is supplied from the transmitting-/receiving portion 162 to the control portion 14. In the distribution switch 15, the ON state of the contact for the terminal device from which this NG signal is transmitted is maintained, while each of the contacts for the terminal devices from which OK signals are transmitted is set to an OFF state.

The data block Nos. 1, 2, ... m are then sequentially read from the distribution information storage portion 11 and the read data blocks are supplied to the distribution switch 15 by the control portion 14. Next, the data block Nos. 1, 2, ... m are sequentially re-transmitted through the contact of the maintained ON state to the terminal device No. 2, as shown in the re-transmission phase in FIG. 5.

When distribution information is correctly received by a terminal device, this terminal device transforms the received distribution information into visible information by an output portion such as a printer, a display device, or the like in the terminal device by using the distribution information stored in a receiving buffer in the terminal device.

It is possible, in the data transmission phase of FIG. 5, to transmit the data block Nos. 1, 2, 3, ... m from the transmitting/receiving portion to the terminal device by attaching an error correction code ECC to follow each of the data block Nos. 1, 2, 3, ... m.

Also, it is possible to construct the system of FIG. 3 so that the information concerning in which data block the transmission failure has occurred is sent from the terminal device where the transmission failure is detected to the node station in the transmission confirmation phase. In this case, only the data block in which the transmission failure has occurred is required to be re-transmitted.

Further, it is possible to construct the system of FIG. 3 so that a transmission confirmation concerning the terminal device to which the data has been re-transmitted is carried out after the completion of the re-transmission, and re-transmissions of data are repeatedly carried out until all the terminal devices receive the distribution information correctly.

We claim:

1. An information distribution system, comprising:
   a node station;
   a plurality of transmission lines; and
   a plurality of terminal devices connected through said transmission lines to said node station;
   said node station comprising:
   distribution storage means for storing information which is to be distributed to said plurality of terminal devices;
   error check code formation means for forming error check code information based upon the information;
   distribution means for selectively distributing the information from said distribution storage means;
   transmitting/receiving means for transmitting a set-up signal, the error check code information and the information to said plurality of terminal devices and for receiving retransmission requests from said plurality of terminal devices;
   control means for providing the set-up signal and the error check code information before transmitting the information from said node station to said terminal devices; and
   re-transmission request response means for retransmitting the information in response to one of the re-transmission requests from one of said plurality of terminal devices;
   each of said terminal devices comprising,
   error checking means for receiving the information and the checking whether the information received from said node station is correct;
   means for dividing the information transmitted from said node station into a plurality of blocks, and for transmitting the retransmission request based on the checking of said error checking means.

2. A system according to claim 1, wherein each of said terminal devices comprises:
   error check code storage means for storing the error code information received from said node station prior to receiving the information distributed by said node station.

* * * * *

UNITED STATES PATENT AND TRADEMARK OFFICE
CERTIFICATE OF CORRECTION

PATENT NO. : 5,007,055
DATED : April 9, 1991
INVENTOR(S) : OSAMU ISONO et al.

It is certified that error appears in the above-identified patent and that said Letters Patent is hereby corrected as shown below:

Col. 6, Claim 1, line 41, "and the" should be --and for--.

Signed and Sealed this

Thirteenth Day of October, 1992

Attest:

DOUGLAS B. COMER

*Attesting Officer*     *Acting Commissioner of Patents and Trademarks*